(12) United States Patent
Cain et al.

(10) Patent No.: US 10,958,989 B2
(45) Date of Patent: Mar. 23, 2021

(54) FRAMEWORK FOR EMBEDDING DATA IN ENCODED VIDEO

(71) Applicant: Synamedia Limited, Middlesex (GB)

(72) Inventors: Harel Cain, Jerusalem (IL); Michal Devir, Haifa (IL); Yaron Sella, Beit Nekofa (IL); Ben Walton, Vancouver (CA)

(73) Assignee: Synamedia Limited, Middlesex (GB)

(*) Notice: Subject to any disclaimer, the term of this patent is extended or adjusted under 35 U.S.C. 154(b) by 213 days.

(21) Appl. No.: 15/052,906

(22) Filed: Feb. 25, 2016

(65) Prior Publication Data

US 2017/0251283 A1 Aug. 31, 2017

(51) Int. Cl.
*H04N 21/845* (2011.01)
*H04N 21/435* (2011.01)
(Continued)

(52) U.S. Cl.
CPC ........ *H04N 21/8451* (2013.01); *H04N 19/13* (2014.11); *H04N 19/174* (2014.11); *H04N 19/176* (2014.11); *H04N 19/188* (2014.11); *H04N 19/46* (2014.11); *H04N 19/467* (2014.11); *H04N 19/593* (2014.11); *H04N 19/70* (2014.11); *H04N 21/23614* (2013.01); *H04N 21/23892* (2013.01);
(Continued)

(58) Field of Classification Search
None
See application file for complete search history.

(56) References Cited

U.S. PATENT DOCUMENTS 7,853,040 B2 12/2010 Thorwirth
8,135,168 B2 3/2012 Geyzel et al.
(Continued)

FOREIGN PATENT DOCUMENTS

GB 2524058 9/2015

OTHER PUBLICATIONS

"Series H: Audiovisual and Multimedia Systems Infrastructure of audiovisual services—Coding of moving video Advanced video coding for generic audiovisual services", ITU-T Telecommunication Standardization Sector of ITU, May 2003 (Year: 2003).*
(Continued)

*Primary Examiner* — Kaitlin A Retallick
(74) *Attorney, Agent, or Firm* — Merchant & Gould P.C.

(57) ABSTRACT

In one embodiment, a video stream is received, and a spatially distinct region of a frame in the received video stream to be modified is identified, the spatially distinct region of the frame being encoded separately from any other region in the frame. A segment of the spatially distinct region of the frame to be modified is extracted. The extracted segment of the spatially distinct region is modified. The extracted segment of the spatially distinct region into a single-segment spatially distinct region is encoded. A network abstraction layer (NAL) header is associated with the encoded single-segment spatially distinct region. The encoded single-segment spatially distinct region and its associated NAL header is inserted into the received video stream following the identified spatially distinct region of the frame to be modified. Related methods, systems and apparatus are also described.

29 Claims, 5 Drawing Sheets

(51) Int. Cl.
| | |
|---|---|
| H04N 21/44 | (2011.01) |
| H04N 21/2389 | (2011.01) |
| H04N 19/467 | (2014.01) |
| H04N 21/236 | (2011.01) |
| H04N 21/431 | (2011.01) |
| H04N 19/13 | (2014.01) |
| H04N 19/174 | (2014.01) |
| H04N 19/176 | (2014.01) |
| H04N 19/169 | (2014.01) |
| H04N 19/46 | (2014.01) |
| H04N 19/593 | (2014.01) |
| H04N 19/70 | (2014.01) |
| H04N 21/4405 | (2011.01) |
| H04N 21/8358 | (2011.01) |

(52) U.S. Cl.
CPC ....... *H04N 21/435* (2013.01); *H04N 21/4316* (2013.01); *H04N 21/44* (2013.01); *H04N 21/4405* (2013.01); *H04N 21/8358* (2013.01)

(56) References Cited

U.S. PATENT DOCUMENTS

| | | | |
|---|---|---|---|
| 8,588,459 B2 | 11/2013 | Bloom et al. | |
| 8,644,377 B2 | 2/2014 | Farkash | |
| 8,995,711 B2 | 3/2015 | Thorwirth | |
| 9,137,010 B2 | 9/2015 | Sella et al. | |
| 9,208,534 B2 | 12/2015 | Cain et al. | |
| 2004/0125952 A1* | 7/2004 | Alattar | G06T 1/0071 380/202 |
| 2004/0230802 A1* | 11/2004 | Moon | H04N 19/467 713/176 |
| 2007/0230584 A1 | 10/2007 | Chiu et al. | |
| 2009/0180702 A1* | 7/2009 | Bordes | H04N 19/70 382/239 |
| 2009/0219987 A1* | 9/2009 | Base | H04N 21/8358 375/240.01 |
| 2010/0254620 A1* | 10/2010 | Iwahashi | H04N 19/70 382/233 |
| 2011/0280434 A1* | 11/2011 | Mamidwar | H04N 21/235 382/100 |
| 2013/0208793 A1 | 8/2013 | Kazui et al. | |
| 2014/0375764 A1* | 12/2014 | Choe | H04N 13/161 348/43 |
| 2018/0302690 A1* | 10/2018 | Tran | H04N 21/44 |

OTHER PUBLICATIONS

International Search Report dated Mar. 27, 2017 for PCT Application No. PCT/IB2017/050671.

Dekun, Zou et al; "H.264 stream replacement watermarking with CABAC encoding," in Multimedia and Expo (ICME), 2010 IEEE International Conference on , vol., No., pp. 117-121, Jul. 19-232, 2010.

Tew, Yiqi et al; "Information hiding in HEVC standard using adaptive coding block size decision," in Image Processing (ICIP), 2014 IEEE International Conference on , vol., No., pp. 5502-5506, Oct. 27-30, 2014.

ITU-T—H.264—Telecommunication Standardization Sector of ITU; Series H: Audiovisual and Multimedia Systems Infrastructure of audiovisual services—Coding of moving video; Advanced video coding for generic audiovisual services; p. 10; Feb. 1, 2014.

Tew et al; "An Overview of Infromation Hiding H.284/AVC Compressed Video"; in IEEE Trans. on Circuit and Systems for Video TEchnology, vol. 24 No. 2, Feb. 2014.

Wikipedia; "Context-adaptive binary arithmetic Coding" Nov. 9, 2015.

\* cited by examiner

FRAMEWORK FOR EMBEDDING DATA IN ENCODED VIDEO

TECHNICAL FIELD

The present disclosure generally relates to methods and systems for providing a framework enabling embedding data into a video stream.

BACKGROUND

Video watermarks are useful for a variety of purposes in the domain of pay television, such as to allow a watermark detector to identify the creator of a video, the operator broadcasting the video, or even the identity of the subscriber receiving the video. The latter is known as forensic watermarking and can serve to identify a traitor, i.e. a legitimate subscriber of a pay TV service who is leaking the stolen video content, and, for example, streaming the stolen video content online.

Traditionally in pay TV systems, if a watermark is meant to be a forensic watermark encoding the identity of an end user, it would be natural to perform embedding of the watermark into the video in the user's client device, for instance, a set top box (STB). Typically, the STB has limited computational power and other restrictions that prevent it from embedding certain kinds of strong watermarks (i.e., imperceptible, resilient, high-capacity etc.) into videos it displays. Therefore, there is a need to embed forensic watermarks at the video headend, prior to releasing the video from the video headend. To do this, the video headend typically broadcasts multiple versions of sections of the video, each of the versions being visually slightly different from each other.

H.264 and H.265 video encoders typically use the Context-based Adaptive Binary Arithmetic Coding (CABAC) entropy encoding system for the entropy coding layer of macroblock-level syntax elements. CABAC is a highly stateful, very adaptive entropy layer that can encode similar streams of syntax elements into significantly differing bitstreams because of how CABAC adapts its context models as it processes the input streams. In other words, even if two frames of video differ in just a single syntax element (such as a prediction mode of one macroblock, a coefficient in the residual of a certain macroblock etc.), the resulting post-CABAC bitstream typically completely differs, from the point in which the syntax elements differ until the CABAC engine is reset, according to the video encoding standard. Because of the stateful nature of CABAC it is challenging to embed a watermark into the video stream as long as the CABAC engine is not reset (which does not typically happen during decoding of a slice, the slice typically comprising a whole picture).

BRIEF DESCRIPTION OF THE DRAWINGS

The present disclosure will be understood and appreciated more fully from the following detailed description, taken in conjunction with the drawings in which.

DESCRIPTION OF EXAMPLE EMBODIMENTS

Overview

In one embodiment, a video stream is received, and a spatially distinct region of a frame in the received video stream to be modified is identified, the spatially distinct region of the frame being encoded separately from any other region in the frame. A segment of the spatially distinct region of the frame to be modified is extracted. The extracted segment of the spatially distinct region is modified. The extracted segment of the spatially distinct region into a single-segment spatially distinct region is encoded. A network abstraction layer (NAL) header is associated with the encoded single-segment spatially distinct region. The encoded single-segment spatially distinct region and its associated NAL header is inserted into the received video stream following the identified spatially distinct region of the frame to be modified. Related methods, systems and apparatus are also described.

EXEMPLARY EMBODIMENT

Figure 1:
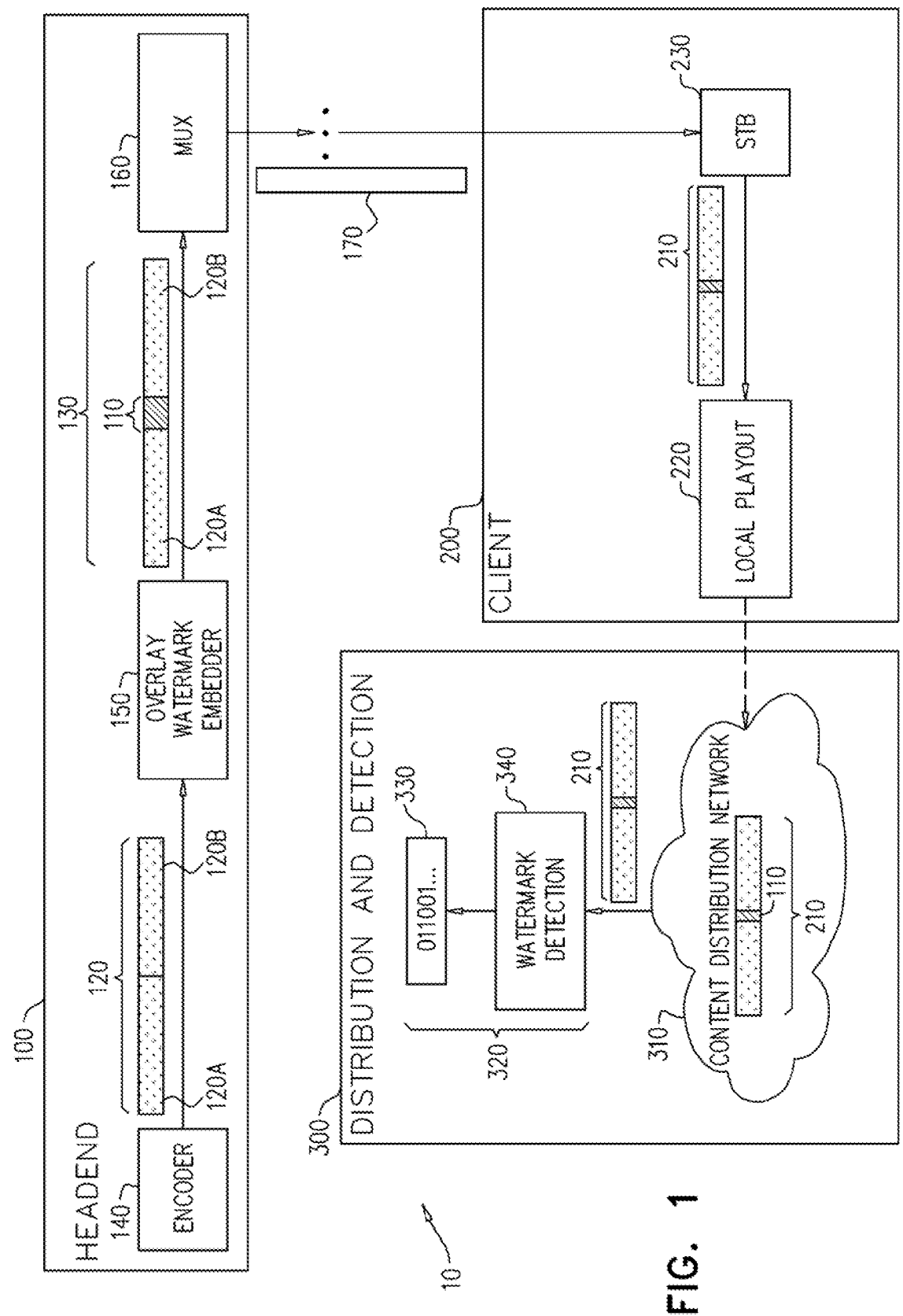
FIG. 1 is a simplified block diagram illustration of a system comprising an overlay watermark embedding sub-system, a client device, and a content distribution network and detection sub-system constructed and operative in accordance with an embodiment of the present invention.

Reference is now made to FIG. 1, which is a simplified block diagram illustration of a system 10, comprising an overlay watermark embedding sub-system, typically disposed at a broadcast headend 100, a client device 200, and a content distribution network and detection sub-system 300 constructed and operative in accordance with an embodiment of the present invention. The three sub-systems 100, 200, 300 of the system 10 of FIG. 1 are now described. It is appreciated that the various sub-systems themselves mentioned above may be described herein as "systems", rather than "sub-systems", particularly in that some of the sub-systems of FIG. 1, are, in and of themselves, independent systems.

The headend 100 is where a video overlay watermark 110 is inserted into an encoded video stream 120, as will be explained below.

The client device 200 is where watermarked video 130, produced by the headend 100 is decoded, producing decoded watermarked video 210, which may optionally be displayed by a local playout system 220. After the decoded watermarked video 210 is decoded, the video may then be captured and made available to a content distribution network 310, as will be explained below.

The content distribution network and detection sub-system 300 is where the captured decoded watermarked video 210 may be uploaded to the content distribution network 310. After the video stream 210 is available for further download in the content distribution network 310, the video stream 210 may then be downloaded and input to a detection system 320 in order to use the overlay watermark 110 which was embedded at the broadcast headend 100 by an overlay watermark embedder 150 in order to determine an identity of a device from which the content was captured and uploaded to the content distribution network 310.

The operation of the sub-systems of FIG. 1 will now be explained.

Turning to the headend 100, the headend 100 comprises an H.264 (sometimes alternatively referred to as either MPEG-4 Part 10 or AVC) or H.265 (sometimes alternatively referred to as High Efficiency Video Coding, HEVC) video encoder 140. The video encoder 140 produces the encoded video steam 120. The encoded video stream 120 is depicted as having two portions, a first portion 120A and a second portion 120B. The encoded video stream 120 is input into the watermark embedder 150. The overlay watermark embedder 150 creates an overlay watermark 110 which is embedded as an overlay in the encoded video stream 120 (as explained below). The encoded video stream 120 comprising the overlay watermark 110, and now referred to as watermarked video 130, is input into a multiplexer (mux) 160. The multiplexer 160 also may comprise an encryptor which encrypts the watermarked video 130. The encrypted multiplexed watermarked encoded video stream 170 is then prepared for, and later, broadcast, as is known in the art.

Embedded Versus Encoded Versus Encrypted

The term "embedded" is used throughout the present specification and claims, in all of its grammatical forms, to refer to any type of activity involving placing the watermark, or portions thereof, in the video stream. For example, "embedding the watermark", "embedded bit", "a watermark embedding device", and so forth.

The term "encoded" is used throughout the present specification and claims, in all of its grammatical forms, to refer to any type of data stream encoding including, for example and without limiting the scope of the definition, well known types of encoding such as, but not limited to, MPEG-2 encoding, H.264 encoding, VC-1 encoding, and synthetic encodings such as Scalable Vector Graphics (SVG) and LASER (ISO/IEC 14496-20), and so forth. It is appreciated that an encoded data stream generally requires more processing and typically more time to read than a data stream which is not encoded. Any recipient of encoded data, whether or not the recipient of the encoded data is the intended recipient, is, at least in potential, able to read encoded data without requiring crypranalysis. It is appreciated that encoding may be performed in several stages and may include a number of different processes, including, but not necessarily limited to: compressing the data; transforming the data into other forms; and making the data more robust (for instance replicating the data or using error correction mechanisms).

The term "compressed" is used throughout the present specification and claims, in all of its grammatical forms, to refer to any type of data stream compression. Compression is typically a part of encoding and may include image compression and motion compensation. Typically, compression of data reduces the number of bits comprising the data. In that compression is a subset of encoding, the terms "encoded" and "compressed", in all of their grammatical forms, are often used interchangeably throughout the present specification and claims.

Similarly, the terms "decoded" and "decompressed" are used throughout the present specification and claims, in all their grammatical forms, to refer to the reverse of "encoded" and "compressed" in all their grammatical forms.

The terms "scrambled" and "encrypted", in all of their grammatical forms, are used interchangeably throughout the present specification and claims to refer to any appropriate scrambling and/or encryption methods for scrambling and/or encrypting a data stream, and/or any other appropriate method for intending to make a data stream unintelligible except to an intended recipient(s) thereof. Well known types of scrambling or encrypting include, but are not limited to DES, 3DES and AES. Similarly, the terms "descrambled" and "decrypted" are used throughout the present specification and claims, in all their grammatical forms, to refer to the reverse of "scrambled" and "encrypted" in all their grammatical forms.

Pursuant to the above definitions, the terms "encoded"; "compressed"; and the terms "scrambled" and "encrypted" are, used to refer to different and exclusive types of processing. Thus, a particular data stream may be, for example:
encoded, but neither scrambled nor encrypted;
compressed, but neither scrambled nor encrypted;
scrambled or encrypted, but not encoded;
scrambled or encrypted, but not compressed;
encoded, and scrambled or encrypted; or
compressed, and scrambled or encrypted.

Likewise, the terms "decoded" and "decompressed" on the one hand, and the terms "descrambled" and "decrypted" on the other hand, are used to refer to different and exclusive types of processing.

The overlay watermark embedder 150 is designed to embed watermarks while using as little extra bandwidth as possible because of the watermark. For simplicity's sake, consider a naive case where two distinct versions of a given video are broadcast separately. Then the total bandwidth used is 100% higher than in the original non-watermarked case. However, it is possible to drastically reduce the extra bandwidth usage by creating short segments of video such that by sequencing those segments of video together multiple versions (usually two for every crypto-period, but may be more than two) of visually distinct videos are created, where the extra bandwidth required is kept to a few percent at most. That is to say, the headend 100 prepares, out of a given video stream 120, multiple well-formed encoded versions of video that will differ from each other in just short segments of their encoded representations, and thus will incur limited bandwidth overhead in a broadcast scenario.

Turning now to the client device 200, the client device may comprise any appropriate video client, such as a set top box (STB) 230 or any other appropriate video client which performs the same or similar function as the STB 230, for example, and without limiting the generality of the foregoing, a personal video recorder (PVR); a hand held computing device, a desktop computing device, and so forth. The STB 230, as is known in the art, demultiplexes, decrypts, and decodes the encrypted multiplexed watermarked encoded video stream 170 and produces the watermarked decoded video stream 210.

The client device 200 may optionally display the watermarked decoded video stream 210, using the local playout system 220, on a local display device, such as a viewing screen or monitor.

The user of the client device 200 (or some other person who has gained access to the client device 200) may be able to capture the watermarked decoded video stream 210, and upload the watermarked decoded video stream 210 to the content distribution network 310. The content distribution network 310 is not a part of a legal broadcast system, and hence may be considered a "rogue" content distribution network 310. Distributing content via the rogue-content distribution network 310 is usually illegal, and the goal of the embedded overlay watermark is to enable finding an ID of the user of the client device 200 who is presumed (until proven otherwise) to have uploaded the content to the rogue-content distribution network 310.

Turning now to the content distribution network and detection sub-system 300, it is appreciated that the distribution and detection network 300 consists of two distinct and not necessarily related sub-systems, namely the content distribution network 310 and the detection system 320. For ease of depiction and description, however, the content distribution network 310 and the detection system 320 are described together. The content distribution network 310 is a content sharing network, as is known in the art, over which content, which need not necessarily have been legally obtained, may be uploaded by a first user (i.e., a leaker, who might be the user of the client device 200) so that other users may then download the content which is available in the content distribution network 310.

For example, the watermarked decoded video stream 210 may have been uploaded to the content distribution network 310. The content distribution network 310 typically operates in the clear from websites subject to a local jurisdiction considered to be lenient regarding copyright enforcement. Other users are then able to download and consume the watermarked decoded video stream 210 from the content distribution network 310. At least one copy of the watermarked decoded video stream 210 may be obtained and input into the detection system 320. The watermarked decoded video stream 210 obtained for the detection system 320 may therefore be obtained by monitoring known content distribution networks 310 and proactively accessing pirated content just like any other non-paying user would.

The detection system 320 attempts to identify the leaker of the content obtained—i.e. the leaker of the watermarked decoded video stream 210, who is presumed to be associated with the client device 200. To do so, the watermarked decoded video stream 210 is input into a watermark detection device or mechanism 340. The watermark detection device or mechanism 340 attempts to retrieve the user ID 330 (i.e. the user ID 330 associated with the client device 200) from the embedded overlay watermark 110 with which the video is associated.

It is appreciated that various systems are known in the art for embedding and for detection of watermarks. By way of a non-limiting example, U.S. Pat. No. 9,208,534 of Cain, et al. and as yet unpublished U.S. patent application Ser. No. 14/790,028, also of Cain, et al. describes such systems.

Figure 2:
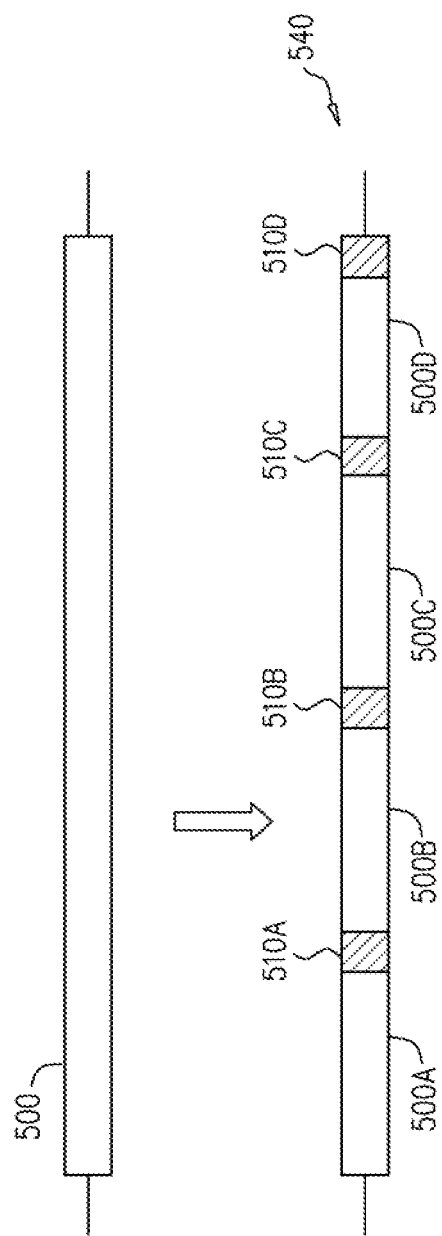
FIG. 2 is a simplified block diagram illustration of a video stream comprising a watermark overlay embedded therein by the watermark overlay embedding sub-system of FIG. 1.

Reference is now made to FIG. 2, which is a simplified block diagram illustration of a video stream comprising a watermark overlay embedded therein by the overlay watermark embedding sub-system of FIG. 1 (i.e. the overlay watermark embedder 150). An encoded video stream 500 appears at the top of FIG. 2. The encoded video stream 500 corresponds to the encoded video stream 120 of FIG. 2.

The encoded video stream 500 comprises video which has been encoded according to one of the H.264 or H.265 encoding scheme. (It has already been pointed out that the video encoder 140 of FIG. 1 comprises an H.264 or H.265 video encoder.)

As was mentioned above, H.264 and H.265 video encoders, such as video encoder 140 (FIG. 1) typically use the Context-based Adaptive Binary Arithmetic Coding (CABAC) entropy encoding system for the entropy coding layer of macroblock-level syntax elements. Accordingly, in order to overcome limitations resulting from CABAC and enable multiple video versions that overlap in the vast majority of their encoded representations, additional mini-slices are constructed such that the additional mini-slices are rendered on top of existing slices (i.e. overlay) by the client device 200. This process, as will be explained in greater detail below, is performed in the overlay watermark embedder 150 of FIG. 1. It is appreciated that the term "mini-slice" is meant to refer to a slice which typically comprises a small number of macroblocks (such as one macroblock).

In accordance with embodiments described herein, as will be explained below, the encoded video stream 500, is broken up into successive portions 500A, 500B, 500C, 500D. Each portion is followed with at least one additional slice, the at least one additional slice comprising at least one macroblock having a watermark. Thus, portion 500A is depicted as followed by slice 510A, portion 500B is depicted as followed by slice 510B, and so forth for portions 500C and 500D, followed, respectively by frame 510C and 510D. The slices 510A, . . . , 510D are used during decoding to create differing version of the decoded content, as will be explained below, with reference to FIGS. 3A and 3B. It is appreciated that the use of four successive portions 500A, 500B, 500C, 500D in the discussion of FIG. 2 is by way of example, and any number of appropriate portions may be used in practice.

Macroblocks in the overlay slices may be modified in the uncompressed domain using methods known in the art before being re-encoded.

At display time the client device 200 is able to produce a decoded watermarked video, such as watermarked video stream 540. It is appreciated that the watermarked video stream 540 may be produced on an individualized per client device 200 basis, as is known in the art. Details of the producing the frames into which the overlay watermarks are embedded are now provided, with reference to FIGS. 3A and 3B.

Figure 3A:
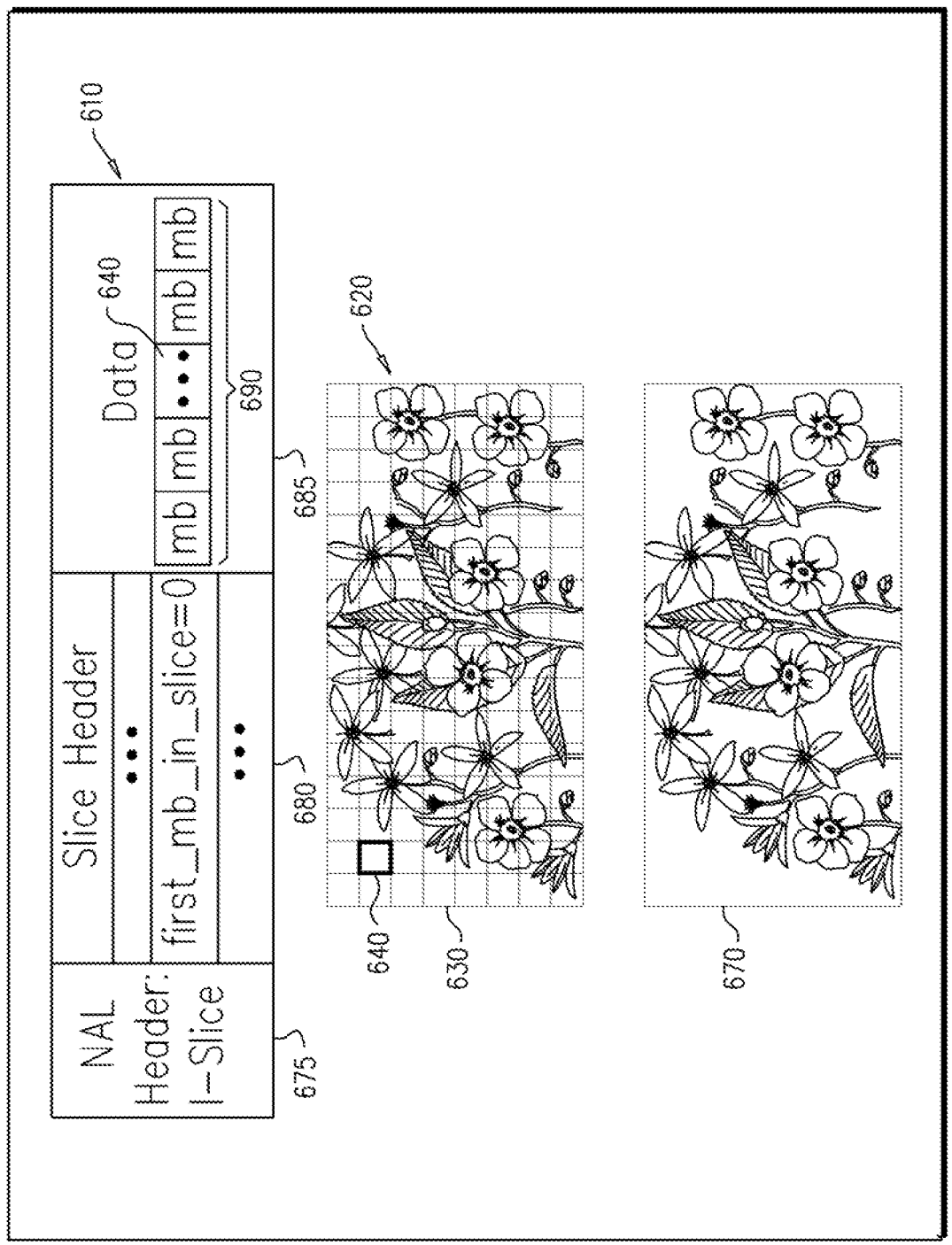
FIG. 3A is a partially block diagram partially pictorial illustration of a video frame prior to being overlaid with a watermark overlay embedded by the watermark overlay embedding sub-system of FIG. 1.

Reference is now made to FIG. 3A, which is a partially block diagram partially pictorial illustration of an H.264 video frame prior to being overlaid with an overlay watermark embedded by the overlay watermark embedder 150 of FIG. 1. FIG. 3A is intended to serve as the "before" picture contrasting with the "after" picture, FIG. 3B. The "before" and "after" states referred to here are before and after overlaying by the overlay watermark embedder 150 of FIG. 1. Turning now to the specific details of FIG. 3A, only those portions of the H.264 coding which are relevant for the present discussion are depicted in FIG. 3A (and, mutatis mutandis, FIG. 3B). A brief discussion of the understanding of FIG. 3A (and the following figures) in an H.265 environment follows the description of FIG. 4.

The detail of FIG. 3A depicts a single video frame of an H.264 video image. As is known in the art, an encoded video image, such as the single video frame depicted in FIG. 3A, comprises a stream of syntactic elements 610 compressed into a stream of bits by the CABAC entropy layer. The series of syntactic elements 610 depicted include various fields which are comprised in the actual H.264 encoding. FIG. 3A also depicts an image 620, with a grid 630 superimposed over the image 620. The grid 630, which does not appear in the actual image—neither as encoded nor as displayed when decoded—is shown in the figure to depict how the image 620 is encoded as a series of macroblocks (each block in the grid 630 may be viewed, for example, as a macroblock) such as macroblock 640. Finally, a depiction of a decoded image 670, which depicts how the image would appear, for example, when the image 620 is displayed by the local playout system 220 (FIG. 1), when the STB 230 (FIG. 1) displays the encoded image 620 (without the grid) by decoding the H.264 encoding of the data elements 610.

Turning to the specific details of the data elements 610 of the H.264 image, the data elements 610 comprise a NAL (network abstraction layer) header 675. As is known in the art, H.264 coded video data is organized into NAL units, each unit containing an integer number of bytes. The H.264 NAL unit has a header byte, such as NAL header 675, which contains an indication of the type of data in the NAL unit. For example, in FIG. 3A the NAL header 675 indicates that the encoded image 620 comprises an I-Slice. It is appreciated that some NAL units comprise a slice and other NAL units do not comprise a slice, but rather comprise other data, for example, picture parameter settings, as is described in the H.264 specification.

The NAL header 675, for NAL units comprising a slice, is followed by a Slice Header 680. The Slice Header 680 comprises a "first_mb_in_slice" field. It is appreciated that although the Slice Header 680 comprises other fields as well, in the interest of brevity, however, only the first_mb_in_slice field is depicted. The first_mb_in_slice field indicates an address of the first macroblock in the series of syntactic elements 610. The Slice Header 680 is followed by data 685 in the video slice, which is depicted as comprising a plurality of macroblocks 690, including encoded macroblock 640. Macroblocks and macroblock addresses are defined in sections 3.75, 3.77 and 3.80 of the H.264 specification.

Figure 3B:
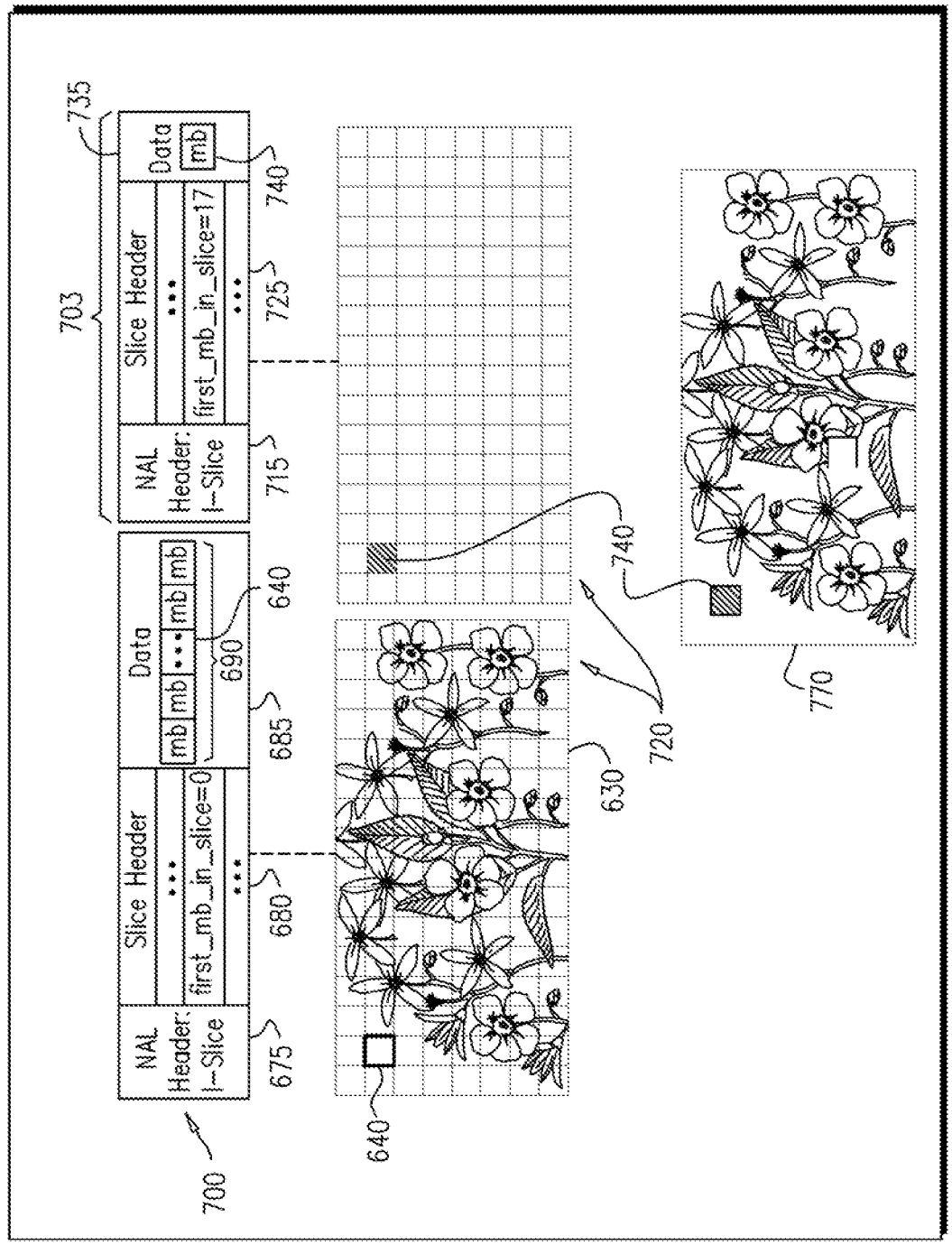
FIG. 3B is a partially block diagram radially pictorial illustration of a video frame after being overlaid with the watermark overlay embedded by the watermark overlay embedding sub-system of FIG. 1.

Reference is now made to FIG. 3B, which is a partially block diagram partially pictorial illustration of an H.264 video frame after being overlaid with the overlay watermark embedder 150 by the overlay watermark embedding of FIG. 1. In addition to the details of the H.264 video frame prior to being overlaid with an overlay watermark, found in 3A which appear on the left side of FIG. 3B, a second slice 703 has been added. Similarly to FIG. 3A, the H.264 video frames are depicted as a stream of bits as a series of data elements 700 showing H.264 slices and detailing various fields which are comprised in the actual H.264 encoding of the H.264 video frames depicted in FIG. 3B. FIG. 3B also depicts H.264 encoded images 720, where each encoded image shows a grid superimposed on the image. As in FIG. 3A, it is noted that the grid does not appear in the actual image, and is intended to depict how each image is encoded as a series of macroblocks. Finally, FIG. 3B shows a depiction of H.264 decoded images 770, depicting how, when the STB 230 (FIG. 1) displays the encoded images by decoding the H.264 series of data elements 700, the images would appear, for example, when the image is displayed by the local playout system 220 (FIG. 1).

The second slice 703 has a NAL header 715 indicating that the slice comprises an I-slice. The second slice 703 also has a slice header 725. The slice header 725 of the second slice 703 comprises a first_mb_in_slice field set equal to 17. The data portion of the second slice 703 comprises a single macroblock 740, corresponding to macroblock 740 as depicted in the second slice in the encoded image 720.

When the encoded image 720 is decoded by the STB 230 of FIG. 1, the decoded image 770 is depicted as being overlaid with the macroblock 740 of the second slice 703. Accordingly, decoded frame 770 appears with the macrolock 740 overlaid on the image in the decoded frame 770. This results because the single macroblock in the data 735 of the second slice 703 is placed, by an H.264 decoder comprised in the STB 230 of FIG. 1 at position 17, i.e., the address of the first macroblock in the slice, as discussed above. Hence, macroblock 740 is placed as depicted in FIG. 3B.

Implementation details for producing and inserting the overlay macroblock, such as macroblock 740 will now be described.

Figure 4:
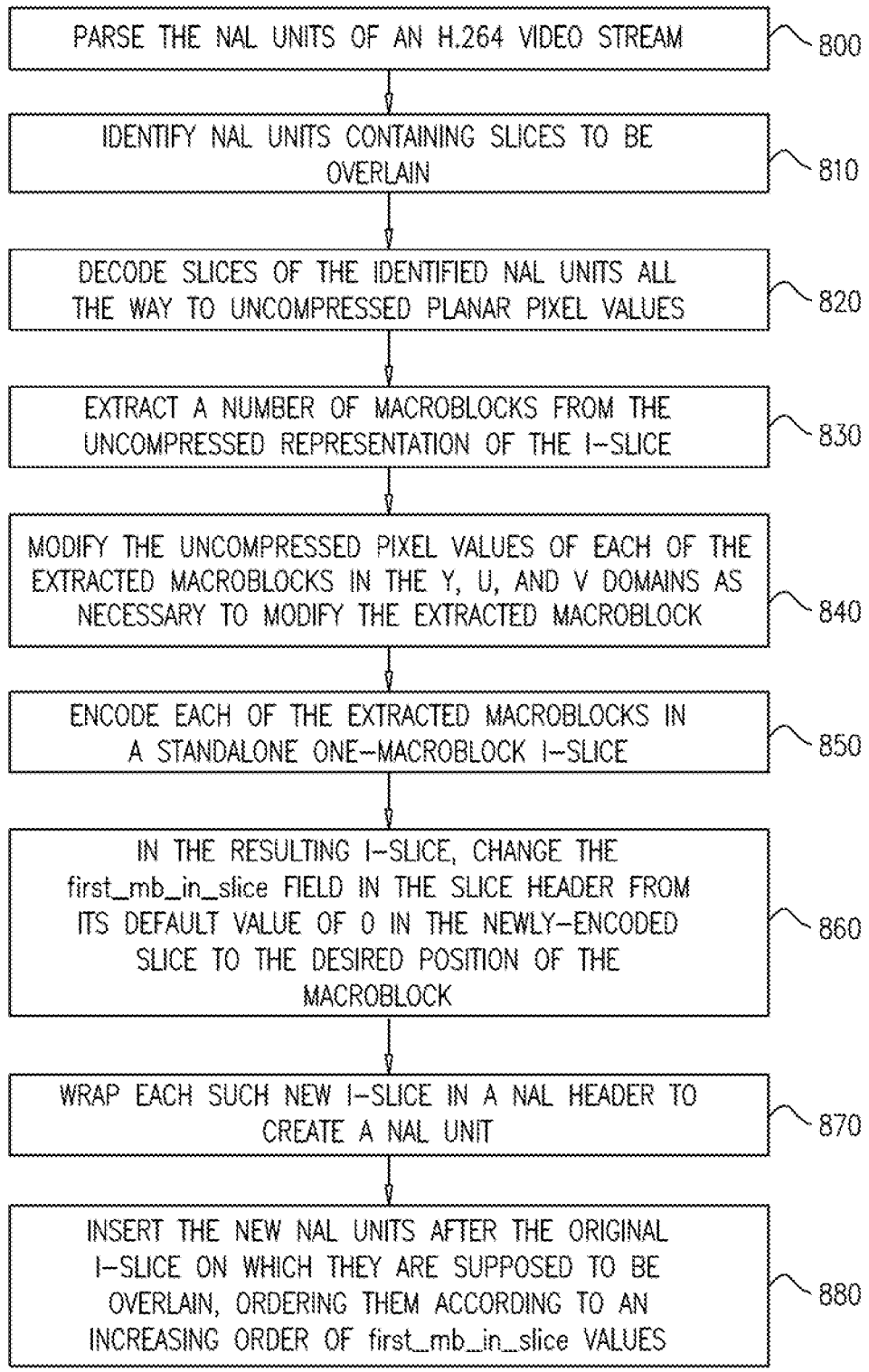
FIG. 4 is a simplified flowchart diagram of a method for producing and inserting Intra-Predicted overlay slices in the system of FIG. 1.

Reference is now made to FIG. 4, which is a simplified flowchart diagram of a method for producing and inserting Intra-Predicted overlay slices in the system of FIG. 1.

It is appreciated that the overlaid macroblock 740 may be generated either as an intra-predicted macroblock (i.e. the macroblock is encoded entirely in a fashion appropriate to a frame which only uses information contained within itself for decoding the frame, without reference to any other frame), or as an inter-predicted macroblock (i.e. the macroblock is encoded in a fashion appropriate to a frame which relies on information contained within other frames for decoding the frame).

The CABAC entropy layer is initialized at the beginning of every slice in H.264. Accordingly, as long as additional slices having NAL headers, such as NAL header 715, are inserted into the video stream 500 (FIG. 2), current slices (such as the slice comprising the video image 630) are not affected in their entropy layer and their binary encoding remains exactly the same. Thus, the binary encoding need not be recalculated for these slices.

Accordingly, in order to add an intra-predicted overlay for any of I-slices, P-slices, or B-slices, the following is performed on an H.264 video stream:

The NAL units are parsed (step 800).

NAL units containing slices which are to be overlaid with macroblocks are then identified (step 810).

The identified slices are then completely decoded so that uncompressed planar pixel values of the decoded slices are determined (step 820). It is appreciated that in order to construct one-macroblock intra-predicted slices to overlay intra-predicted slices, there will effectively be no prediction at all in those one-macroblock intra-slices (i.e. DC prediction will be used in these macroblocks). Thus, the one-macroblock intra-slices must therefore be re-encoded, because those macroblocks were originally predicted from neighboring macroblocks in the input slice and so have only small residuals. See sections 8.3.1.2.3 equation 8-51 and 8.3.2.2.4 equation 8-94, 8.3.3.3 equation 8-121, also equations 8-138 and 8-141 of the H.264 standard. Note that when there is no neighboring frame from which to predict the macroblock, the prediction mode is DC mode with a constant/fixed value for all pixels.

A number of macroblocks from an uncompressed representation of an I-slice are extracted (step 830). It is appreciated that the number, the locations, and whether these locations are constant or change over time is not relevant for the implementation of the present method. A description as to how these parameters might be determined is provided, by way of example, in U.S. Pat. No. 9,208,534 to Cain, et al.

The pixel values in the Y, U and V domains of each of the extracted uncompressed macroblocks is appropriately modified, for instance, in order to create a covert (or overt) watermark in the uncompressed macroblock (step 840). The watermark may be embedded by any appropriate manner known in the art. By way of a non-limiting example, the watermark may be embedded using the watermark embedding technique as described in the above-mentioned U.S. Pat. No. 9,208,534, of Cain, et al.

Those skilled in the art will appreciate that the modification of the extracted uncompressed macroblocks mentioned above may, in addition to watermarking, also be utilized for purposes requiring video manipulation in the compressed domain, and the discussion of watermarking is one embodiment by way of a non-limiting example. For instance, embodiments of the present invention may entail modifying a macroblock for:

logo insertion;

removing or bluffing at least a portion of the macroblock to be modified, such as, but not limited to faces or other details in the video, for example, faces of minors; or other appropriate modifications which may be performed on the video after encoding.

Each one of the extracted macroblocks into which a watermark has been embedded is then encoded anew as a standalone one-macroblock I-slice (step 850). As a consequence of being encoded into a new standalone one-macroblock I-slice, persons of skill in the art will appreciate that the new slice will have a DC prediction mode, as was explained above. Alternatively, and optionally the I_PCM mode for the single macroblock in the slice may be used (i.e. the encoder 140 (FIG. 1) bypasses the prediction and transform coding processes and instead directly outputs the values of the encoded samples). If the I_PCM mode is used, encoding becomes computationally trivial (as I_PCM macroblocks are basically non-compressed), but a higher extra bandwidth is required by the I_PCM macroblocks for the very same reason.

The first_mb_in_slice field in the slice header in the resulting new one-macroblock I-slice is then changed from its default value of 0 to be the same as the macroblock address of the desired position of the single macroblock in the one-macroblock I-slice (step 860). It is appreciated that the first_mb_in_slice field in the slice header is coded using Exponemial-Golomb (ExpGolomb) coding as mandated by the H.264 standard (see section 7.3.3). Additionally, any byte alignment requiting padding at the beginning of slice_data( ) is fixed, as mandated by the H.264 standard, see for instance section 7.3.4.

Each new one-macroblock I-slice is then wrapped in a NAL header in order create a NAL unit for the one-macroblock I-slice (step 870). Note that there are separate byte alignments for the slice header and then again for the whole NAL, as specified in section 7.3.4 and 7.3.2.8 of the H.264 standard.

The new NAL unit is inserted into the video stream after the original I-slice on which its single macroblock is supposed to be overlaid (step 880). When more than one new NAL unit is to be inserted into the video stream, the new NAL units should be placed according to an increasing order of first_mb_in_slice values, in order to conform with section 7.4.3 of H.264 standard.

The above described method will insert at least one one-macroblock I-slice that will be rendered on top of existing slices in an H.264 Annex B compliant byte stream, regardless of whether said existing slices are inter-predicted or intra-predicted slices.

It is appreciated that a slice_type field in the NAL header 675 (FIGS. 3A and 3B) may impose that all other slices in a given picture are of the same type (see the H.264 standard, table 7-6, and associated text). Accordingly, where needed, a one-macro lock P-slice or B-slice may be produced by searching in the video stream for macroblocks from which to predict in neighboring frames. Motion vectors and so forth may then be used to predict the one-macroblock P-slice or B-slice using intra-prediction, as is detailed in the H.264 specification. The other steps described in FIG. 4 are left unchanged.

It is appreciated that although the above description is provided in teens of H.264, embodiments of the present invention may be applied to H.265, and possibly to other video encoding standards as those skilled in the art will appreciate. It is further appreciated that in the above discussion, the video stream is, accordingly, understood to refer to one of an H.264 compliant video stream or an H.265 compliant video stream. When the video stream comprises an H.264 compliant video stream, the slice comprises an H.264 compliant slice, the macroblock comprises an H.264 compliant macroblock, and the first_mb_in_slice comprises an H.264 compliant first_mb_in_slice. Alternatively, when the video stream comprises an H.265 compliant video stream, the slice comprises an H.265 compliant slice segment, the macroblock comprises an H.265 compliant coding tree block, and the first_mb_in_slice comprises an H.265 compliant slice_segment_address. Similar adaptations of terminology from H.264 to H.265, such as, but not limited to an H.264 slice_data( ) field corresponding to an H.265 slice_segment_data( ) field, and so forth, will be understood by persons of skill in the art. It is appreciated that the H.264 compliant slice and the H.265 compliant slice segment may be viewed as a spatially distinct region of a video frame, such as frame 510C and 510D. This spatially distinct region of the video frame comprises a data structure that can be decoded independently from other such spatially distinct regions of the same video frame. The H.264 compliant macroblock and the H.265 compliant coding tree block comprise one segment of the spatially distinct region of a video frame. For H.264 systems, setting the first_mb_slice field in the NAL header comprises associating a header with the encoded one (single) segment spatially distinct region of the video frame. Similarly, In H.265 systems, setting the slice_segment_address field in the NAL header comprises associating a header with the encoded one (single) segment spatially distinct region of the video frame.

Accordingly, in any other encoding scheme relying on constructs which correspond to "Slices" or "Slice Segments"; "Macroblocks" or "Coding Tree Blocks" and so forth, the generalized terms: "spatially distinct region of a frame" and "segment of a spatially distinct region of a frame" will be understood be persons of skill in the art understood to apply.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove.

What is claimed is:

1. A method comprising:

receiving a video stream;

identifying a spatially distinct region of a frame in a first portion of the received video stream to be modified, the spatially distinct region of the frame being encoded separately from any other region in the frame, the spatially distinct region having an address wherein the address indicates the spatially distinct region's location in the frame;

extracting a segment of the spatially distinct region of the frame to be modified;

modifying the extracted segment of the spatially distinct region;

encoding the extracted segment of the spatially distinct region into a single-segment spatially distinct region, wherein encoding the extracted segment comprises encoding each of a plurality of macroblocks of the extracted segment into which a watermark is embedded into a standalone one macroblock I-slice;

associating a network abstraction layer (NAL) header with each of a plurality of one macroblock I-slices of the encoded single-segment spatially distinct region, wherein associating the NAL header with each of the plurality of one macroblock I-slices of the encoded single-segment spatially distinct region comprises:

creating a new NAL unit for each of the one macroblock I-slice of the plurality of one macroblock I-slices, updating a slice header field of the new NAL unit from a default value to another value that indicates a determined position for the one macroblock I-slice in the extracted segment of the spatially distinct region, updating a data field of the new NAL unit to include the encoded single-segment spatially distinct region, and wrapping the encoded single-segment spatially distinct region comprising the updated slice header field in the new NAL unit; and inserting a plurality of new NAL units into the received video stream following the first portion, wherein inserting the plurality of new NAL units comprises inserting the plurality of new NAL units after an original I-slice on which the watermark is overlaid, and wherein each of the plurality of new NAL units is inserted in accordance to an increasing order of the position indicated in the slice header field of each of the plurality of new NAL units.

2. The method according to claim 1 wherein the video stream comprises an H.264 compliant video stream, the spatially distinct region of the frame comprises an H.264 compliant slice, and the segment of the spatially distinct region of the frame comprises an H.264 macroblock.

3. The method according to claim 1 wherein, the extracting comprises extracting at least two segments of the spatially distinct region of the frame and, a corresponding resulting at least two new NAL units are inserted following the spatially distinct region of the frame.

4. The method according to claim 1 wherein the modifying the extracted segment of the spatially distinct region of the frame comprises embedding a watermark into the extracted segment of the spatially distinct region of the frame.

5. The method according to claim 1 wherein the modifying the extracted segment of the spatially distinct region of the frame comprises embedding a logo into the extracted segment of the spatially distinct region of the frame.

6. A system comprising: a video stream receiver operative to receive a video stream; and a video embedder operative to: identify a spatially distinct region of a frame in a first portion in the received video stream to be modified, the spatially distinct region of the frame being encoded separately from any other region in the frame, the spatially distinct region having an address wherein the address indicates the spatially distinct region's location in the frame; extract a segment of the spatially distinct region of the frame to be modified; modify the extracted segment of the spatially distinct region of the frame; encode the modified extracted segment of the spatially distinct region of the frame into a single-segment spatially distinct region, wherein the video embedder being operative to encode the modified extracted segment comprises the video embedder being operative to encode each macroblocks of the modified extracted segment into which a watermark is embedded into a standalone one macroblock I-slice; associate a network abstraction layer (NAL) header with each of a plurality of one macroblock I-slices of the encoded single-segment spatially distinct region, wherein the video embedder being operative to associate the NAL header with each of the plurality of one macroblock I-slices of the encoded single-segment spatially distinct region comprises the video embedder operative to: create a new NAL unit for each of the one macroblock I-slice of the plurality of one macroblock I-slices, update a slice header field of the new NAL unit from a default value to indicate a determined position for the one macroblock I-slice in the frame of the video stream, update a data field of the new NAL unit to include the one macroblock I-slice, wherein the position of the one macroblock I-slice comprises the address, and wrap the encoded single-segment spatially distinct region comprising the updated slice header field in the new NAL unit; and insert a plurality of new NAL units into the received video stream following the first portion, wherein the a plurality of new NAL units are inserted after an original I-slice on which the watermark is overlaid, and wherein each of the plurality of new NAL units is inserted in accordance to an increasing order of the position indicated in the slice header field of each of the plurality of new NAL units.

7. The system according to claim 6 wherein the video stream comprises an H.264 compliant video stream, the spatially distinct region of the frame comprises an H.264 compliant slice, and the segment of the spatially distinct region of the frame comprises an H.264 macroblock.

8. The system of claim 6, wherein the extracted segment is modified by embedding a watermark into the extracted segment.

9. The system of claim 6, wherein the extracted segment is encoded in a DC prediction mode.

10. The system of claim 6, wherein the extracted segment is modified by embedding a logo into the extracted segment.

11. The system of claim 6, wherein the new NAL unit is inserted into the video stream after the extracted segment.

12. A non-transitory computer readable storage medium comprising computer-executable instructions which, when executed by a computing device, will cause the computing device to perform a method comprising: receiving a video stream; identifying a spatially distinct region of a frame in the received video stream to be modified, the spatially distinct region having an address, wherein the address indicates the spatially distinct region's location in the frame; extracting a segment of the spatially distinct region of the frame to be modified; modifying the extracted segment of the spatially distinct region; encoding the extracted segment into a single-segment spatially distinct region, wherein encoding the extracted segment comprises encoding each of a plurality of macroblocks of the extracted segment into which a watermark is embedded into a standalone one macroblock I-slice; associating a network abstraction layer (NAL) header with each of a plurality of one macroblock I-slices of the encoded single-segment spatially distinct region, wherein associating the NAL header with each of the plurality of one macroblock I-slices of the encoded single-segment spatially distinct region comprises: creating a new NAL unit for each of the one macroblock I-slice of the plurality of one macroblock I-slices, updating a slice header field of the new NAL unit from a default value to another value that indicates a determined position for the one macroblock I-slice in the extracted segment of the spatially distinct region, updating a data field of the new NAL unit to include the encoded single-segment spatially distinct region, and wrapping the encoded single-segment spatially distinct region comprising the updated slice header field in the new NAL unit; and inserting a plurality of new NAL units into the received video stream following the first portion, wherein inserting the a plurality of new NAL units comprises inserting the a plurality of new NAL units after an original I-slice on which the watermark is to be overlaid, wherein each of the plurality of new NAL units is inserted in accordance to an increasing order of the position indicated in the slice header field of each of the plurality of new NAL units.

13. The non-transitory computer readable storage medium of claim 12, wherein the extracted segment of the spatially distinct region of the frame is modified by embedding a logo into the extracted segment of the spatially distinct region of the frame.

14. The non-transitory computer readable storage medium of claim 12, wherein the extracted segment of the spatially distinct region is modified by embedding a watermark into the extracted segment.

15. The non-transitory computer readable storage medium of claim 12, wherein the extracted segment of the spatially distinct region is encoded as in a DC prediction mode.

16. The non-transitory computer readable storage medium of claim 12, wherein the new NAL unit is inserted into the video stream after the extracted segment.

17. The non-transitory computer readable storage medium of claim 12, wherein the extracted segment of the spatially distinct region of the frame is modified by modifying pixel values in Y, U, and V domains of the extracted segment.

18. The method according to claim 1, wherein the video stream comprises an H.265 compliant video stream, the spatially distinct region of the frame comprises an H.265 compliant slice segment, and the segment of the spatially distinct region of the frame comprises an H.265 compliant coding tree.

19. The method according to claim 18, wherein the associating the NAL header with the encoded single-segment spatially distinct region comprises setting a slice_segment_address field in a slice header in the single-segment spatially distinct region, the slice_segment_address field being a coding tree block address of the extracted segment of the spatially distinct region, the setting the slice_segment_address field in the slice header being done by modifying the slice_segment_address field and wrapping the encoded single-segment spatially distinct region comprising the modified slice_segment_address field in the NAL header.

20. The method according to claim 19, wherein, the extracting comprises extracting at least two segments of the spatially distinct region of the frame and, a corresponding resulting at least two new NAL units are inserted following the at least one spatially distinct region of the frame, according to an increasing order of the new NAL units' slice_segment_address values.

21. The method according to claim 1, wherein the spatially distinct region of the frame comprises an intra-coded spatially distinct region of the frame.

22. The method according to claim 21, and further comprising decoding the extracted spatially distinct region of the frame prior to performing the step of extracting the segment of the spatially distinct region from the identified spatially distinct region of the frame.

23. The method according to claim 21, wherein the encoding the extracted segment of the spatially distinct region into a single-segment spatially distinct region is performed using DC prediction mode.

24. The method according to claim 21, wherein the encoding the extracted segment of the spatially distinct region into a single-segment spatially distinct region is performed using I_PCM mode.

25. The method according to claim 21, wherein the encoding the extracted segment of the spatially distinct region comprises modifying at least one pixel in one of a Y, a U, or a V domain.

26. The method according to claim 1, wherein the spatially distinct region of the frame comprises an inter-coded at least one spatially distinct region of the frame.

27. The method according to claim 26, wherein the encoding the extracted segment of the spatially distinct region into a single-segment spatially distinct region further comprises encoding the segment of the spatially distinct region of the frame into a single-segment spatially distinct region to incorporate a reference to a same reference picture as is referred to by the identified spatially distinct region of the frame to be modified.

28. The method according to claim 26, wherein the modifying the extracted segment of the spatially distinct region comprises modifying at least one of the extracted one segment's: residual values; prediction modes; or motion vectors.

29. The system according to claim 6, wherein the video stream comprises an H.265 compliant video stream, the spatially distinct region of the frame comprises an H.265 compliant slice segment, and the segment of the spatially distinct region of the frame comprises an H.265 compliant coding tree.

* * * * *